United States Patent [19]

Saniez et al.

[11] Patent Number: 5,364,641
[45] Date of Patent: Nov. 15, 1994

[54] PROCESS FOR MANUFACTURING DAIRY PRODUCTS

[75] Inventors: Marie-Hélène Saniez, Lambersart; Michel Serpelloni, Beuvry-les-Bethune, both of France

[73] Assignee: Roquette Freres, Lestrem, France

[21] Appl. No.: 20,527

[22] Filed: Feb. 22, 1993

Related U.S. Application Data

[63] Continuation of Ser. No. 535,196, Jun. 8, 1990, abandoned.

[30] Foreign Application Priority Data

Jun. 8, 1989 [FR] France ................................ 89 07602

[51] Int. Cl.$^5$ ................................................ A23C 9/12
[52] U.S. Cl. ........................................ 426/34; 426/36; 426/38; 426/39; 426/43
[58] Field of Search ............... 426/34, 36, 38, 40, 426/42, 43, 37, 39, 41, 650, 580, 582, 583

[56] References Cited

U.S. PATENT DOCUMENTS

| Re. 32,079 | 2/1986 | Sandine et al. | 426/34 |
| 4,435,432 | 3/1984 | Klupsch | 426/43 |
| 4,621,058 | 11/1986 | Reddy | 426/43 |
| 4,851,238 | 7/1989 | Bussière et al. | 426/39 |
| 4,906,481 | 3/1990 | Bussière et al. | 426/39 |
| 4,917,905 | 4/1990 | Guy et al. | 426/39 |
| 4,919,944 | 4/1990 | Bussière et al. | 426/39 |
| 4,959,229 | 9/1990 | Reddy et al. | 426/39 |

Primary Examiner—Donald E. Czaja
Assistant Examiner—Leslie Wong
Attorney, Agent, or Firm—Keck, Mahin & Cate

[57] ABSTRACT

Improved process for manufacturing dairy products, characterized by the fact that it comprises the use of an effective amount of at least one of the gluconic and glucoheptonic ions at the latest at the time at which there is a risk of the occurrence of phagic attack of said ferments.

5 Claims, No Drawings

PROCESS FOR MANUFACTURING DAIRY PRODUCTS

This is a continuation of application Ser. No. 17/535,196, filed Jun. 8, 1990 now abandoned.

BACKGROUND OF THE INVENTION

The invention relates to an improved process for manufacturing dairy products.

It is known that the manufacture of dairy products—this expression comprising yogurts, fresh cheeses, renneted cheeses and "large curds"—comprises the formation of what is called the curd which is itself, at least in part, the result of the acidifying action on the starting material—namely the milk—of one or several acids and/or of one or several bacterial microorganisms of the family of acidifying lactic ferments, possibly in the presence of a coagulating enzyme and/or of one or several lactic ferments with flavoring action.

It is also known that microorganisms of the family of lactic ferments, just as other bacteria, when they are in the presence of specific bacteriophages, are attacked and lysed, that is to say destroyed, by these viruses which grow at their expense.

Now, the growth of the bacteriophages and the subsequent destruction of the lactic ferments is manifested, according to the nature of the lactic ferments concerned, by a disturbance of the acidification—and, consequently, of the formation of the curd, of which disturbance the economic consequences may be disastrous—and/or by disturbance of the organoleptic qualities of the dairy products obtained.

It follows that counteracting the proliferation of bacteriophages or more simply of phages, which withstand conventional pasteurisation treatments, constitutes one of the major preoccupations of the dairy products industry.

Thus, it has been proposed to resort to disinfectants such as hypochlorites, iodophores and formol; but even with strict hygiene (particularly by sterilization of the air and of the equipment from the pail to the manufacturing tank), it is difficult and expensive to remove the bacteriophages completely.

It has also been proposed to resort to take advantage of the fact that the phages need the presence of calcium ions to be able to infect bacteria. Thus, so-called "anti-phage" culture media, adapted to remove or block calcium ions, have recently appeared on the market; they are, generally, complex mixtures containing milk dehydrated or not, growth factors and large amounts of phosphates to sequester the calcium ions.

Now, these large amounts of phosphates present in the anti-phage media can cause metabolic damage to lactic yeast cultures.

And, especially, the complexing of the calcium has a negative influence on the cheese making suitability, in particular on coagulation (lengthing of the coagulation time, less firmness of the gel).

It has again been proposed either to eliminate the so-called maturation phase of the milks for cheese making, or to change lactic ferments each time the tank is refilled.

It is true that, in the first case, the lactic ferments being directly seeded into the manufacturing tank during the refilling of the latter, the phages present are trapped in the curd network formed during the clotting after the addition of the rennet which comes into action preferably as soon as possible after the seeding; however, besides the high cost of this method of working, the suppression of ripening is not without consequences and remains therefore necessary in the case of milks treated thermally by cold storage or a pasteurisation treatment.

In the second case, the risk of attack of the phages and the consequences of the latter are considerably reduced but, on the other hand, the production costs are considerably increased; in addition, the rotation of the strains, that is to say the change of the strain of lactic ferments on each replenishment, results in variations in the matter of acidification times, in the matter of the amount of ferments to be added and especially in the matter of the organoleptic qualities of the finished dairy products.

GENERAL DESCRIPTION OF THE INVENTION

Now, Applicants, who have had the merit of discovering that gluconic and glucoheptonic ions inhibited the development of specific phages of lactic ferments, have perfected an improved process of manufacturing dairy products, characterized by the fact that it comprises the employment of an effective amount of the above-said ions at the latest at the time when there is a risk of phagic attack occurring.

According to an advantageous embodiment, the above-said improved process of manufacturing dairy products comprises at least one of the following conventional steps, namely:

that of maturation of the milk in the course of which the latter is placed in the presence of acidifying lactic ferments and/or flavoring lactic ferments, that of renneting, that of curd formation and that of ripening as well as that comprising conventional mechanical treatments between the steps of curd formation and ripening, said process being characterized by the fact that an effective amount of at least one of gluconic and glucoheptonic ions is employed at the latest at the moment of the use of the lactic ferments.

In practice, the ions concerned are employed at the time of the maturation phase.

Due to the process according to the invention, it becomes possible to act effectively against the development of the specific phages of the above-said lactic ferments without unfavorable effect on the manufacture of the desired dairy products and the organoleptic properties of the latter, thus protecting said lactic ferments against phagic attack during the acidification step.

In an advantageous embodiment of the above-mentioned process, the effective amount of gluconic and/or glucoheptonic ion employed is from 2 to 500 g/hectoliter of milk.

The invention is directed also, and this by way of agents limiting the proliferation of the specific phages of the lactic ferments, to chemical compounds releasing gluconic and glucoheptonic ions within the scope of their use in the process according to the invention.

Proposing, consequently, to combat proliferation of the specific phages of lactic ferments in the dairy products industry, advantage is taken of the surprising and unexpected ability of gluconic and glucoheptonic ions, that Applicants have had the merit of discovering and due to which the development of the above-said phages is inhibited in their presence.

Consequently, procedure is preferably such that the above-said ions are present in the milk constituting the raw material for the manufacture of a dairy product of the type concerned at the moment when the lactic ferments are used.

The milk used may be a milk or a mixture of milks from any source, reconstituted or not, raw or having undergone a prior heat treatment; it may be standardized in fat and/or in inorganic matter; it can also be a milk concentrated, for example, by ultra-filtration.

The gluconic and/or glucoheptonic ion may be introduced by the corresponding acid, by the alkali salts, among which are ammonium salts or by alkaline earth salts of these acids; preferably, the gluconic ion is introduced in the form of a gluconolactone or glucoheptonolactone, the glucono-delta-lactone being particularly preferred.

The acid, the salt or the lactone may be employed in the form of a solution in water or in milk, or in powder form, in which case their dispersion in the milk and their solubilization are ensured by any suitable stirring means.

The gluconic and/or glucoheptonic ion having to be present at the time of employment of the lactic ferments, they are introduced into the raw milk or into the milk which has previously undergone heat treatment or again in the so-called "large curd" tanks, in which the lactic ferments are cultivated for their use in the process of manufacturing the dairy product concerned or in the maturation tanks.

Advantageously, the amount of gluconic and/or glucoheptonic anion used is from 5 to 250 g/hl of milk and, preferably, it is from 25 to 100 g/hl of milk.

DESCRIPTION OF PREFERRED EMBODIMENTS

The invention will be well understood by means of the illustrative examples which follow and which comprise the description of advantageous embodiments.

In these examples, the effectiveness of the process according to the invention is shown.

on the one hand, by direct determination of the reduction of the number of phages with respect to a control in a culture of lactic ferments intended for the dairy products industry, that is to say at the level of manufacture of the "large curd" (Example 1), on the other hand, and still for each case with respect to a control, in a certain number of manufactures of particular dairy products (Examples 2 to 4).

EXAMPLE 1

Manufacture of the Large Curd

Into two separate containers, preparation of two "large curds" is simulated, the first according to the prior art, the second with the application of the features of the process according to the invention.

The lactic ferment used is the lyophilised strain *Streptococcus lactis* IL 561 lyophilisée (kindly supplied by Madame M. C. CHOPIN of I.N.R.A. of Jouy-en-Josas, France).

This strain is inoculated into 50 ml of M 17 culture medium whose composition is described in the work "Technique d'Analyse et de Contrôe dans les IAA", vol. 3, page 110, ed. APRIA.

4 ml of the culture thus produced after 24 hours of incubation at 25° C. are introduced respectively into two Erlenmeyers flasks each containing 150 g of milk, autoclaved previously for 30 minutes at 95° C., one of the two Erlenmeyers containing in addition, conforming with the process according to the invention, 36 mg of glucono-delta-lactone or GDL in the form of a solution containing 9 g of GDL per liter, in other words 4 ml; the whole is maintained in both cases at 25° C. for about 15 hours.

The curded milk so obtained in the two Erlenmeyers is used to seed in its turn respectively 5 liters of sterilized; it is left to incubate at 25° C. for 15 hours.

The final acidity of the medium which constitutes the "large curd", is 80° D in both cases.

It is on the two "large curds" cultures thus prepared that a count of the phages is carried out.

To do this, the so-called method of "phages "lysed areas" is used which was described by W. A. COX in 1980 in an article entitled "Detection and enumeration of mesophilic lactic bacteriophages", p. 29–36 of "Starters in the manufacture of cheese", IDF FIL Doc. 129, Bruxelles.

In practice, procedure is as follows.

On a gelose base constituted from M 17 culture medium (whose composition is indicated in the work "Technique d'Analyse et de Contrôle dans les IAA", vol. 3, page 110, éd. APRIA.) and from 18 g of agar/1, is introduced 0.1 ml *Streptococcus lactis* culture, strain IL 561 (cultivated on M 17 medium and aged for 15 hours), 0.05 ml of a molar solution of $CaCl_2$, 0.1 ml of the phage suspension obtained after filtration of the large curd on a 0,2 $\mu$filter; this filtrate can then be diluted.

The phages present are rapidly fixed on the bacteria; the adsorption is terminated after about 5 minutes.

Then in each case 2.5 ml of soft gelose obtained by dissolving agar in M 17 culture medium (4 g of agar per liter of M 17 medium) is then added.

The appearance of the lysed zones occurs within 10 hours.

In the case of the first test, the method concerned shows that, in neither of the two cases, were there phages in the culture medium.

The experiment was then continued respecting the conditions actually prevailing in the industry.

In other words, a "large curd" was prepared every 3 days for 4 months in the same container by means of inoculi derived from the same storage stock, that is to say from the freeze dried strain.

On each tenth preparation of the large curd, the test described above was recommenced and the number of phages present was determined.

The first test being denoted by the number N1, the four following tests carried out respectively after the first, second, third and fourth months were given the numbers N2 to N5.

In Table I below, is indicated for each of the tests the number of phages detected.

TABLE I

| Test Number | Number of phages present | |
|---|---|---|
| | Culture according to the prior art | Culture according to the invention |
| N1 | No phage | No phage |
| N2 | Absence of phage | No phage |
| N3 | $10^2$ phages/ml | Detection of phages < 10/ml |
| N4 | $10^{11}$ phages/ml phagic accident | $10^2$ phages/ml |

TABLE I-continued

| Test Number | Number of phages present | |
|---|---|---|
| | Culture according to the prior art | Culture according to the invention |
| N5 | $10^{11}$ phages/ml | $10^2$ phages/ml |

The superiority of the process according to the invention is clear from the indications shown in this Table.

EXAMPLE 2

Manufacture of Cheddar

It is recalled that the manufacture of cheddar comprises the following steps:

a) Maturing of the milk

To 500 l of milk at a temperature of 31° C. (pasteurised at 72° C. for 16 seconds), placed in a double jacketed tank provided with a stirrer, is added 1.5% of lactic ferments (*Streptococcus lactis* strain).

b) Curd formation

After 25 minutes, 90 ml of a strong rennet 1:15000 is added. It is stirred at average speed (10 r.p.m.) for 5 minutes. After stopping the stirrer, the stirring blades are removed. 25 minutes is allowed for the formation of the curd.

c) Cutting up

When the curd has reached the desired firmness (about 1 hour after rennetting), the cutting follows.

d) Cooking of the grains of curd

After cutting up and still in the same tank, the cooking is started gradually, by injecting steam into the double Jacket of the tank. The temperature is increased up to 38° C. at the rate of 2° C. per 5 minutes, with gentle and constant stirring. The temperature of 38° C. is maintained for a further 45 minutes.

e) Drainage

The stirring is stopped and the free whey is removed. The temperature of the tank is kept at 38° C.

f) Cheddarisation

The curd freed from whey is cut up lengthwise to permit good exudation of the whey contained in the curd for 15 minutes. Then the curd is cut in the other direction; the blocks so obtained are separated and left to stand for 15 minutes at a temperature of 38° C. After cheddarisation, the titratable acidity must be from 0.50 to 0.60%. The optimum pH of the curd was 5.2–5.3.

g) Crumbling of the lumps of curd

The lumps of curd are crumbled above the tank so that the crumbs may fall into the latter.

h) Salting

Salt is sprayed on to the crumbled curd in the proportion of 1 kg per estimated 500 kg of curd. The salt is added in three batches in order to facilitate its dissolution.

i) Molding and pressing

A given amount of curd (for example 15 kg) is taken and placed in a metal mold; a pressure of 1.7 bar is applied for 18 hours.

j) Drying

After stopping the pressing, the cheese is placed, for 2 or 3 days, in a drying chamber at 13° C. and 70% humidity with daily turning over of the cheese.

k) Ripening

The cheese is surrounded with a film of paraffin by dipping for 6 seconds into liquid paraffin of which the temperature is 118° C. After hardening of the paraffin, the cheese is kept for refining for at least 60 days at 4° C. in an atmosphere with 85% relative humidity.

For the requirements of the example, a first specimen of cheese is manufactured by proceeding as it has just been described and in parallel a second specimen by proceeding in the same manner except that the maturation of the milk is performed by adding to pasteurized milk (72° C. -16 seconds) cooled to 31° C., an amount of 1 g of GDL in powder form per liter of milk, and then the ferments coming from the strain *Streptococcus lactis* (IL 561).

Tasting of the two specimens of cheese did not show a difference of appearance, of texture and of organoleptic properties.

These two manufactures were repeated ten times (during a period of 12 months; they were pilot tests).

The phagic infection which occurred in the manufactures, not comprising the addition of gluconic ion according to the invention, required 7 changes of strains during this period.

In the case of the manufacture according to the invention, it was only necessary to change the strain once.

EXAMPLE 3

Manufacture of Cottage Cheese

It is recalled that the manufacture of cottage cheese comprises the following steps.

500l of milk is pasteurized by treatment at 72° C. for 16 seconds. The milk thus pasteurized is then cooled to 31° C. and placed in a double Jacketed tank provided with a stirrer.

Lactic ferments are added (*Streptococcus lactis, Streptococcus cremoris* and *Leuconostoc citrovorum*) during the filling of the tank, this addition being done in the form of powder and in the amount of 5%.

Milk comprising lactic ferments is kept at the temperature of 31° C. for 5 hours until the formation of curd. The acidity of the serum is then 0.52% and its pH 4.6.

The curd is cut up into blocks which are allowed to stand for 15 to 30 minutes. Water at the temperature of 46° C. is introduced into the double jacket of the tank and the cooking of the curd is started with gentle stirring (10 rpm).

The temperature of the water introduced in the double jacket is increased very slowly to 49°–52° C. to cook the curd, an operation which should be continued for about 100 minutes to obtain the desired firmness. A portion of the serum is removed by simple evacuation and then the blocks of curd are allowed to stand for 10 to 30 minutes.

After cooling to 29° C., the curd is washed with demineralized water for 10 minutes and then drained. After further washing, the curd is brought to 15° C. It is washed a third time and then cooled to 4° C.

After draining, the curd is cut up into grains; care is taken that the temperature does not rise above 7° C.

A cream is prepared which has to be mixed with the cut up curd to provide the final cottage cheese.

To do this, 56.3% by weight of whole milk is mixed with 39.7% by weight of sweet cream and with 4,0% by weight of salt.

The cream and the cut up curd are mixed in the proportion of 167 liters of cream per 500 liters of curd, mixing gently for 15 minutes.

The finished product has the following properties:
fats:4.5% by weight
humidity:79 % by weight pH:5.2.

For the requirements of the example, a first specimen of cottage cheese is manufactured by proceeding as it has just been described and, in parallel, a second specimen by proceeding in the same manner except that at the same time than the lactic ferments is introduced an amount of 0.5 g of GDL, in powder form, per liter of milk.

These two manufactures were repeated 15 times (during a period of 12 months; they were pilot tests).

Phagic infection occurring in the manufactures, not comprising the addition of gluconic ion according to the invention, necessitated 5 changes of strains during this period.

In the case of the manufacture according to the invention, it was not necessary to change the strain through the whole year.

EXAMPLE 4

Manufacture of a Pressed Cheese of Saint-Paulin type

It is recalled that the manufacture of cheese of the type concerned comprises the following steps.

An amount of 500 liters of milk is brought, under normal industrial conditions, to 26.7 g/l of fat.

Pasteurization at 72° C. for 40 seconds follows, then it is cooled again to 31° C.

The milk thus heat treated, was brought into a tank designated for the manufacture of pressed cheese; it was on oval tank of the 3000 l type manufactured by the Guérin S. A. 79210 Mauzé-sur-le-Mignon (France) equipped with two curd cutters.

The pH measured on the whole milk at the moment of its introduction at 31° C. into the tank was 6.65. An addition of soluble calcium salt was then made in the form of 490 ml of a solution of 510 g/l of calcium chloride in water.

The maturation of this milk was carried out by an addition of mesophilic lactic ferments prepared under the following conditions: a concentrated and frozen preparation of mesophilic lactic ferments, marketed by the Laboratoires Miles—Division Marshall (rue des Longs Réages—28280 Epernon—France), was cultured in the nutrient medium Marstar marketed by the sae Laboratories, applying strictly the conditions of preparation recommended by these Laboratories.

An amount of 3 liters of this culture (0.6% in volume with respect to the volume of treated milk) is mixed with the milk at the moment of introduction of the latter into the maturation tank.

After 30 minutes of maturation, the pH of the milk was 6.60 and its temperature 31° C.

The renneting was performed in the maturation tank; to do this, there was introduced per liter of milk an amount of 0.33 ml of a commercial preparation of coagulating enzymes containing 520 mg of chymosine per liter.

The setting time was 16 minutes; the curd formation was allowed to continue, under traditional conditions, for 6 minutes; this additional period was called hardening time.

The coagulum was then cut up in the tank by slow rotation of the two curd cutters which each make 3 turns in 1 minute.

The cut up coagulum was left to stand for 5 minutes.

Cutting up followed by means of the two curd cutters, by bringing the latter for 1 minute to a rotary speed of 12.5 rpm, then for 3 minutes to a speed of 10 rpm.

Following this treatment, the curd grains had reached the desired size which was comprised between 0.5 and 1 cm. The curd-whey mixture was left to stand for 5 minutes. The pH was then 6.58.

The subsequent operation of washing the curd included the removal of the supernatant whey (which represented 33% of the initial volume of 500 liters) by means of a pump, then the addition of an equal volume of potable water of temperature 32° C.

It was followed by a mashing, reversing the direction of rotation of the curd cutters; his mashing included a first phase of 6 minutes at high speed (13 rpm) in order to individualize the grains which have a tendency to agglomerate, then a second phase of 2 minutes at a speed of 7 rpm. The temperature was then 31.5° C.

The curd-whey assembly was transfered to a prepressing tank (length 1.82 m; width 1.75 m; height 0.62 m, whose two opposite vertical surfaces were perforated to permit the drainage of the whey), equipped previously internally with a linen cloth of weft of the order of 2 mm. This cloth was then folded over the upper part of the curd so as the completely enclose it. The operation of prepressing in the tank was carried out in 5 minutes by distributing a load over the whole upper surface such that there resulted therefrom a regular pressure of about 600 Pa (6 g/cm$^2$).

In this way a firm and cohesive slab of curd was obtained which was cut up into loaves with a square base of 38.5 cm side; these loaves were introduced into individual molds and placed under pressure in premises at 18° C. The pressing is carried out for about 45 minutes, with a pressure of about 6.10$^3$ Pa (60 g/cm$^2$), turning over of the loaves (with a view to regularizing the shape) being carried out 15 minutes after the start.

At the end of pressing, each loaf was cut up into twelve parallelepipeds which corresponded to the final size of the cheeses (length:19 cm, width and height:6.5 cm). The pH is then 6.30.

The lactic ferments present in said cheeses then continued the acidification so as to bring the pH to 5.6 after 4 hours.

Then salting of the cheeses followed.

After 18 hours, this operation called pickling was finished; the pH was 5.40.

Analysis of the finished cheeses showed that the total dry matter was 50.08%, the total fat 20.5% and the ratio fat/dry matter (F/D) 40.93.

For the requirements of the example, a first specimen of cheese was manufactured by proceeding as it has just been described and, in parallel, a second specimen by proceeding in the same manner, except that at the moment of maturation, 0.2 g of powdered GDL was added per liter of milk.

On emerging from the pickling, analysis of the manufactured cheeses with the addition of GDL Gave the following values:

total dry matter:52.10
total fat:20.75
F/D:39.83.

These two manufacturers were repeated 20 times during a total period of two years.

The phagic infection which occurred in the manufactures, not including the addition of gluconic ion according to the invention, necessitated 7 changes of strains during this period.

In the case of manufactures according to the invention, it was not necessary to change strain even once.

We claim:

1. Method for inhibiting the development of specific phages of acidifying lactic ferments during the manufacture of dairy products comprising an acidification step of milk under the acidifying action of said lactic ferments, wherein an effective amount of at least one of gluconic ions and glucoheptonic ions is introduced into the milk at the time of employment of said lactic ferments, at the latest during the acidification step, thus protecting said lactic ferments against phagic attack during the acidification step.

2. Method according to claim 1, wherein the at least one of said gluconic ions and said glucoheptonic ions is introduced in the form of acids, alkali salts or lactones thereof.

3. Method according to claim 1, wherein the said effective amount of the at least one of said gluconic ions and said glucoheptonic ions is from 5 to 250 g per hectoliter of milk.

4. Method according to claim 1, wherein the dairy products being manufactured are selected from the group consisting of large curds, yoghurts, fresh cheeses, renneted cheeses and pressed cheeses.

5. Method according to claim 1, wherein the dairy products being manufactured are selected from the group consisting of cottage cheeses, cheddar cheeses and Saint-Paulin cheeses.

* * * * *